(12) United States Patent
Smith et al.

(10) Patent No.: US 6,701,616 B2
(45) Date of Patent: Mar. 9, 2004

(54) METHOD OF REPAIRING SHROUD TIP OVERLAP ON TURBINE BUCKETS

(75) Inventors: Eric Garrard Smith, Marietta, GA (US); Robert Krummen, Cincinnati, OH (US); Jeffrey Reid Thyssen, Delmar, NY (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 10/184,045

(22) Filed: Jun. 28, 2002

(65) Prior Publication Data

US 2004/0000050 A1 Jan. 1, 2004

(51) Int. Cl.7 .................................................. B23P 15/00

(52) U.S. Cl. .................. 29/889.1; 29/889.2; 29/402.09; 29/402.13; 29/402.18

(58) Field of Search ............................. 29/889.1, 889.2, 29/402.02, 402.04, 402.13, 402.16, 402.18; 228/119

(56) References Cited

U.S. PATENT DOCUMENTS

| | | | | |
|---|---|---|---|---|
| 4,115,152 A | * | 9/1978 | Johansson | 148/197 |
| 4,291,448 A | * | 9/1981 | Cretella et al. | 29/889.1 |
| 4,589,175 A | * | 5/1986 | Arrigoni | 29/889.1 |
| 6,233,822 B1 | * | 5/2001 | Grossklaus et al. | 29/889.1 |
| 6,269,540 B1 | * | 8/2001 | Islam et al. | 29/889.7 |

* cited by examiner

Primary Examiner—I Cuda Rosenbaum
(74) Attorney, Agent, or Firm—Nixon & Vanderhye

(57) ABSTRACT

Shroud covers for buckets of gas turbines sometimes overlap one another. To repair a shroud cover overlap and preclude further overlap during turbine operation, a first weld bead of high hardness material is applied along the radial inside surface of the overlapping cover and adjacent an intermediate edge of the Z-shaped edges of the covers. Additional weld beads of a more ductile material are applied along the same surface behind the initial weld bead to structurally support the high hardness initially applied weld material. By building up weld material along the inside radial face of the overlapping cover adjacent the overlapped edge of the adjoining cover, the thickness of the overlapping cover is increased to preclude shroud cover overlap during further turbine operation.

20 Claims, 4 Drawing Sheets

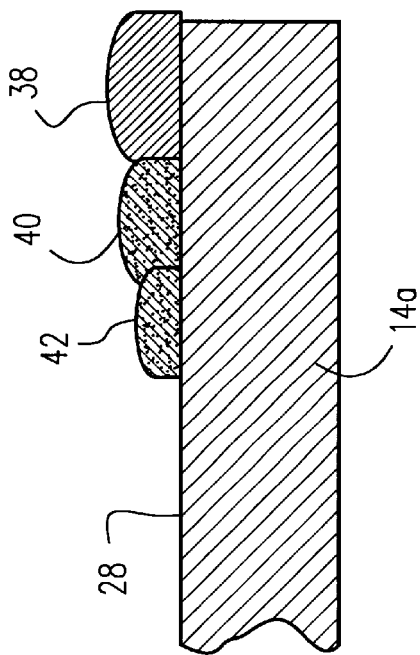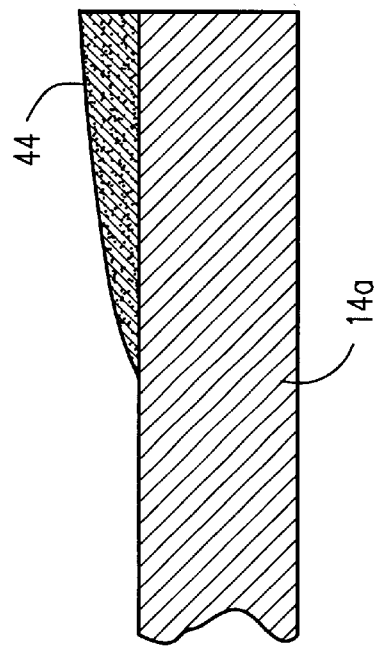

METHOD OF REPAIRING SHROUD TIP OVERLAP ON TURBINE BUCKETS

BACKGROUND OF THE INVENTION

The present invention relates to a method of repairing shroud tip overlap on turbine buckets and particularly relates to a method of weld repairing shroud overlap in situ.

In various types of turbines and stages thereof, a shroud is employed to circumferentially surround the tips of adjacent buckets in a stage. This generally annular shroud is formed of a series of covers, typically with each bucket mounting an individual cover at its tip. The covers of adjacent buckets effectively butt one another at operating speeds of the turbine and form an almost solid annulus about the buckets without physical interlocking. A typical shroud cover has circumferentially opposed edges substantially in a Z-shape as viewed radially. Thus, the three edges of each shroud cover register with the corresponding three edges of an adjacent shroud cover at normal operating speeds. However, only the center faces or edges make contact with one another and the adjacent faces or edges run with a designed clearance.

Shroud cover overlap has occurred in certain turbines. That is, an edge of one of the shroud covers sometimes will overlap an adjacent edge of an adjacent shroud cover. Should this overlap condition occur, the buckets are not effectively locked in place at normal operating speeds of the turbine. Rather, one edge of a cover projects radially outwardly beyond the radially underlying edge of the adjacent cover, while the opposite edge of the overlapped cover is spaced from the edge of an adjacent cover. Moreover, buckets with shroud overlap have a potential for high-cycle fatigue resonance at running speed which can lead to bucket wear and potential for failure. While it is conventional to tear down the turbine and remove the bucket during normal outages for bucket repair and/or replacement, and at which time repair an extant shroud overlap, this type of repair is performed only during scheduled outages to address normal wear and does not typically address the problem of shroud overlap. While the turbine can be shut down should a shroud overlap occur and the bucket and cover removed and replaced, a shutdown of this nature is not economically practical since the service time to tear down the turbine including removal of the turbine outer casing and effect the repair and the extra costs associated with an out-of-service turbine are substantial. Accordingly, there has developed a need for a method of repairing shroud tip overlap of turbine buckets which can be accomplished in situ, at low cost and minimum out-of-service time for the turbine.

BRIEF DESCRIPTION OF THE INVENTION

In accordance with a preferred embodiment of the present invention, there is provided a method of repairing shroud tip overlap in situ. Particularly, the area of the shroud tip overlap is identified. The rotor is then rotated to position the shroud tip overlap at a location accessible to an individual working in the annular space formed by the diffuser shroud aft of the turbine stage, i.e., preferably bottom dead-center. The overlapped shroud covers are then deshingled such that the circumferentially registering edges of the adjacent shroud covers lie in circumferentially spaced registration with one another. The inner radial surface of the overlapping shroud cover is then prepared for receiving weld material. For example, the inner radial surface of the overlapping shroud cover adjacent its overlapping edge area is ground with a small burring tool to remove surface oxides and other foreign material. A material of high hardness, for example, Stellite, is then applied to the inside radial surface of the overlapping shroud cover adjacent its overlapping edge in the form of a single weld bead. Preferably, the weld bead is applied adjacent the intermediate edge portion of the Z-shaped edge of the overlapped shroud cover. By adding the weld bead adjacent the overlapping edge of the overlapping shroud cover, the weld material builds up in a radial inward direction to form an edge in registration with the adjacent edge of the previously overlapped shroud cover.

The edge of the initially applied weld bead of hard material is ground back to match the edge of the overlapping shroud cover. An additional one or more weld beads of a different weld material, for example, Inconel 625, are also applied to the inner radial shroud surface directly adjacent, i.e., behind the initial weld bead to form a structural backing for the initial weld bead material. The weld beads are then ground to fair the surface along the inside radial face of the overlapping shroud cover. A Z-notch corner is also ground to a small radius to reduce the stress concentration. As a consequence, the additional material added by the welds along the inside radial surface of the overlapping shroud cover affords further radial inward thickness to the shroud cover for registration with an edge of the adjacent shroud cover, preventing shroud overlap.

In a preferred embodiment of the present invention there is provided a method of inhibiting overlap of adjacent shroud covers at tips of turbine buckets, comprising the step of increasing the radial extent of one of the adjacent shroud covers adjacent an edge thereof to a location substantially in circumferential registration with another of the adjacent shroud covers.

In a further preferred embodiment of the present invention there is a method of inhibiting overlap of adjacent shroud covers at tips of turbine buckets, comprising the step of increasing the thickness of one of the adjacent shroud covers by applying weld material along a radial facing surface adjacent an edge thereof substantially in circumferential registration with another of the adjacent shrouds.

BRIEF DESCRIPTION OF THE DRAWINGS

FIG. 6 is an enlarged fragmentary cross-sectional view illustrating the various weld beads forming the weld repair at an intermediate stage of the repair; and FIG. 7 is a view similar to FIG. 6 illustrating a final completed weld repair.

DETAILED DESCRIPTION OF THE INVENTION

Figure 1:
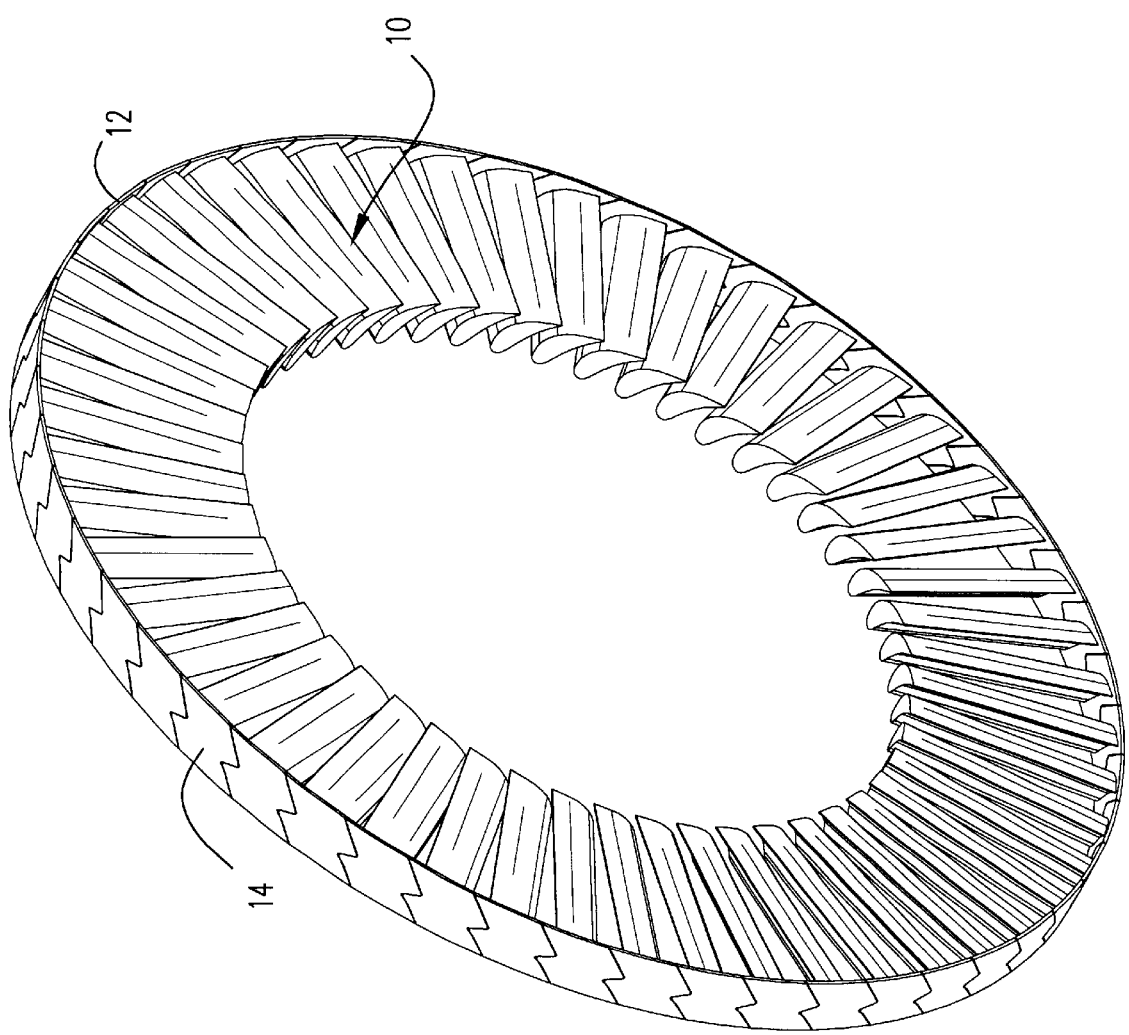
FIG. 1 is a schematic perspective view of bucket shroud covers and buckets for a stage of a turbine with the rotor on which the buckets are mounted omitted.

Referring now to the drawings, particularly to FIG. 1, there is schematically illustrated an annular array of buckets, generally designated 10, and a shroud 12 surrounding the outer tips of the buckets. As illustrated, the shroud 12 comprises a plurality of shroud covers 14 which, at operating speed of the turbine, have circumferentially registering edges in butting relation to one another, effectively forming a closed shroud about the buckets 10. In one form of shroud cover, opposite edges of each cover are formed in a generally Z-configuration, with three edges along each side of the cover in circumferential registration with corresponding edges of an adjacent shroud cover. In a preferred embodiment, one shroud cover 14 is provided for each bucket 10, although it will be appreciated that individual covers may span the tips of two or more adjacent buckets.

Figure 2:
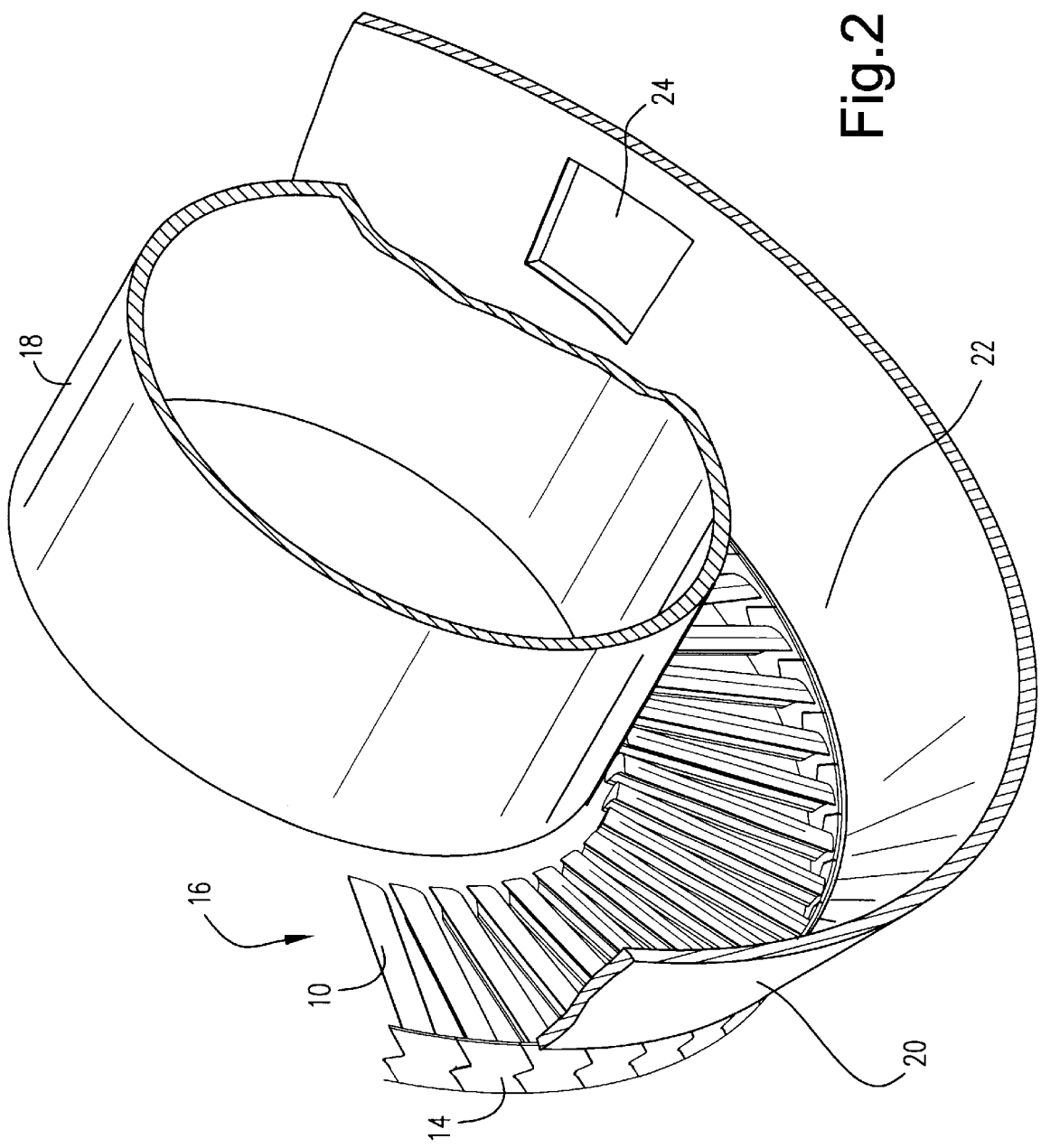
FIG. 2 is a schematic perspective view illustrating the annular space in the diffuser exhaust shroud which affords limited access for repair of the shroud overlap of the last-stage buckets.

In FIG. 2, a final stage of the turbine is illustrated, including the buckets 10 and shroud 12. It will be appreciated that the hot gases of combustion exit from the final stage of the turbine into an exhaust diffuser assembly generally indicated 16. The diffuser assembly has inner and outer shells 18 and 20, respectively, which define an annular space 22 into which the exhaust gas flows. A manhole 24 is provided adjacent the bottom of the exhaust diffuser assembly 16. Manhole 24 provides limited access for an individual into the annular space 22 and to the final stage of the turbine, the annular space 22 providing a workspace for an individual lying prone on the outer shell 20 on the downstream side of the final turbine stage.

Figure 3:
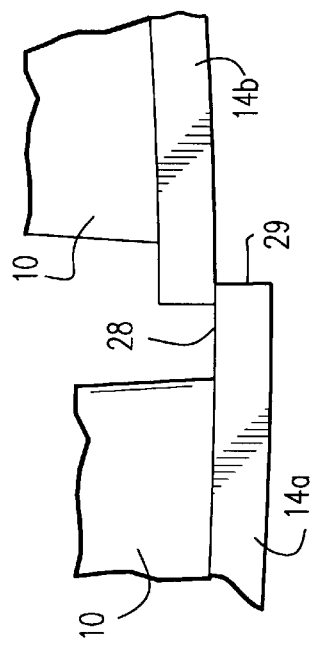
FIGS. 3 and 4 are fragmentary axial elevational views illustrating the shroud cover overlap and the repaired shroud cover, respectively.
Figure 4:
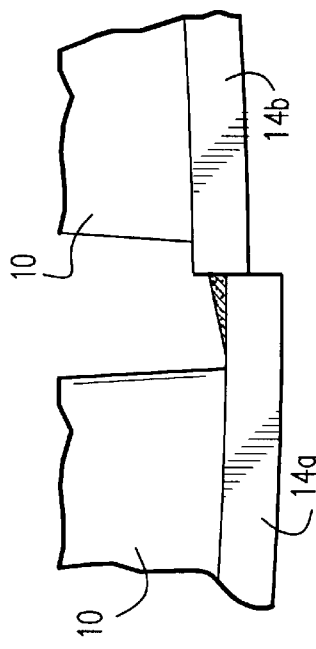

Referring to FIG. 3, overlapping adjacent shroud covers 14a and 14b are illustrated at bottom dead-center. The edge of shroud cover 14a illustrated is displaced into an overlapping position relative to a corresponding edge of an adjacent shroud cover 14b. It will be appreciated that in this configuration the opposite edge of the overlapping shroud cover 14a forms a significant circumferential gap or space with the adjoining shroud cover, not shown. As noted previously, shroud cover overlaps, as illustrated, have potential for high-cycle fatigue resonance at running speed with increased wear and potential for failure. Consequently, repair of the overlapping shroud is required and, in accordance with a preferred embodiment of the present invention, is accomplished in situ, i.e., without tear down of the turbine including removal of the turbine casing and other parts. With the manhole open, an individual is able to obtain access to the area of the shroud overlap by crawling into the annular space within the diffuser exhaust assembly 16. The rotor of the turbine is also ratcheted to position the bucket with the shroud cover overlap at bottom dead-center, enabling the individual to have access to the overlapped shroud when lying prone within the diffuser assembly. With access to the overlapping shroud covers obtained, the thickness of the overlapping shroud is then measured. The buckets carrying the overlapping and overlapped bucket covers 14a and 14b, respectively, are then leveraged apart. The shroud cover-to-shroud cover height difference at the Z-lock centerline is then measured and recorded. The overlapping shroud thickness, previously measured, is subtracted from the height difference and recorded.

Figure 5:
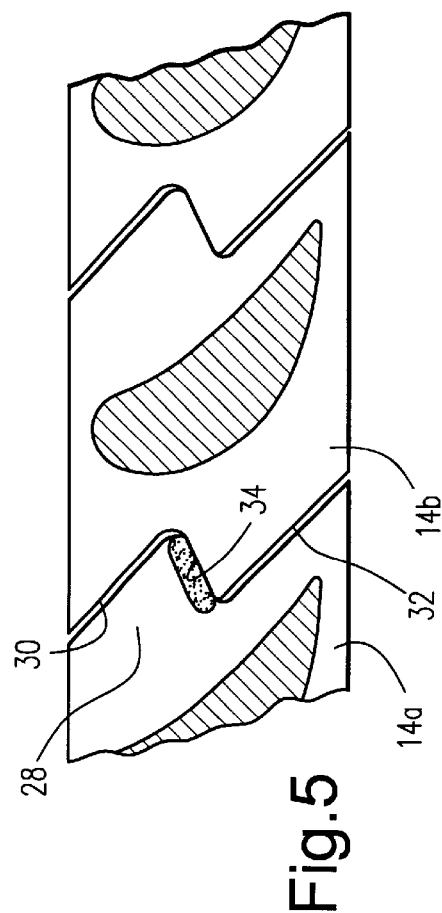
FIG. 5 is a fragmentary cross-sectional view through adjacent buckets as viewed radially outwardly illustrating a completed weld repair along an inside surface of a shroud cover.

The buckets of the overlapping and overlapped covers 14a and 14b, respectively, are then further separated in a circumferential direction by leveraging the buckets and maintained in the separated position. This exposes the radially inwardly facing surface 28 of the overlapped shroud cover 14a adjacent the edge which overlaps with the overlapping shroud cover 14b. As illustrated in FIG. 5, the edges of each shroud cover are in a Z-configuration with leading and trailing edge portions 30 and 32, respectively, and an intermediate edge portion 34 between the leading and trailing edges 30 and 32. The weld repair in the preferred embodiment of the present invention is effected along the radial inside surface 28 of the overlapping shroud cover 14a adjacent intermediate edge portion 34. It will be appreciated that the weld material on the inside radial surface of the overlapping shroud covers 14a is provided only along the intermediate edge portion 34. Moreover, only sufficient weld material is applied to preclude reshingling, e.g., 0.25 inches wide by 0.030 to 0.050 inches thick along edge 34, but not enough weld material is applied to induce shroud microcracking within the weld heat affected zone.

With the shroud covers 14a and 14b spaced one from the other, the radial inside surface 28 of the overlapping shroud cover 14a adjacent intermediate edge 34 is ground in preparation for welding. For example, an air grinder and air belt sander can be employed to remove surface oxides and other foreign material. Note that the edge 29 of the overlapping shroud cover 14a in registration with the adjoining cover edge is not ground. In an air atmosphere with argon backup, a first weld bead 38 with filler material, preferably Stellite, is applied along the inner radial shroud cover surface 28 such that the weld bead 38 protrudes slightly beyond, e.g., by about 0.010 inches, the contact edge of the shroud cover 14a. This initial weld bead 38 has very high hardness and extends substantially the entire length of the intermediate edge 34 along the inside radial surface 28 of cover 14a. The weld bead 38 along the inside radial surface of the cover 14a is intended to add thickness to the shroud cover adjacent the intermediate edge 34 and adjacent the contact edges between adjacent covers to preclude shroud cover overlap during turbine operation.

An additional one or more beads, preferably two beads 40 and 42 of a different weld material, for example, Inconel 625, are applied to the inner radial surface 28 of the cover 14a adjacent the initial weld bead formed of stellite material as illustrated in FIG. 6. That is, the one or more additional weld beads 40 and 42 of the more ductile weld material is applied to the radial inside surface 28 of cover 14a behind the initial weld bead 38. The additional one or more weld beads 40 and 42 of more ductile material serves as a structural component and affords a high backing strength to the harder initial weld bead 28 such that the harder material can withstand loads. Two or three beads using the initially applied Stellite weld material may also be applied as the backing in lieu of the Inconel 625 material. However, it is preferable to employ the Inconel 625 as a backstopping material in view of the need to avoid microcracking which is accomplished by applying only a first bead of the Stellite material. The exposed surfaces of the weld beads 38, 40 and 42, as illustrated in FIG. 6, are then ground and sanded to provide a faired surface 44, as illustrated in FIG. 7. Additionally, the edge of the initially applied weld bead is ground back to lie flush with the edge of the shroud cover 14a. In this manner, the highly hardened material, such as stellite, which is initially applied to the inside radial surface 28 of the overlapping shroud cover 11a, provides a radially inwardly raised contact surface with the adjacent shroud covers to preclude shroud overlap during subsequent turbine operation. Preferably, a radius is also formed in the corner of the Z-notch at the weld material to reduce the stress concentration at that location.

The buckets are then released from their leveraged apart condition and a shroud cover to shroud cover height difference, i.e., a step height at the Z-notch centerline, is measured and recorded. The step height is then subtracted from the adjacent shroud thickness to determine "engagement" and recorded. An engagement of 0.050 inches is the minimum needed to preclude shroud overlap. Upon completing the repair and exiting the exhaust diffuser, the turbine is then run at base load for a period of time, for example, two hours, for post-weld heat treatment/exposure. This allows an additional weld quality verification inspection in a timely manner. For example, if the weld quality is low, weld cracking would appear after the first bead cycle. Thus, the integrity of the weld can be immediately verified after the initial visual weld inspection. Additional weld verification steps can be performed after subsequent turbine starts, e.g., inspections performed using red dye penetrant or fluorescent penetrant inspections for weld cracking.

It will be appreciated from the foregoing description that the shroud overlap problem is repaired in situ without removal of the buckets and without turbine casing removal or long periods of outage. It is also noted that the weld size should be small enough to preclude shroud microcracking, i.e., crack indications less than 0.030 inches are allowed, and a weld width of about 0.25 inches. The weld size, however, should be large enough to preclude reshingling which preferably requires an engagement of 0.050 inches. Also, the weld application and grinding does not impact the shroud contact surface along its circumferentially facing edge. Thus, the hardened contacting circumferentially facing edges of adjacent shroud covers remain in contact with one another during turbine operation. That is, those edges are initially hardened, e.g., with applied Stellite material, during the original equipment manufacture of the covers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of inhibiting overlap of adjacent shroud covers at tips of turbine buckets, comprising the step of:
   increasing the radial extent of one of the adjacent shroud covers adjacent an edge thereof to a location substantially in circumferential registration with another of the adjacent shroud covers.

2. A method according to claim 1 including applying weld material along a portion of a radial facing surface adjacent said edge of said one shroud cover.

3. A method according to claim 1 including applying a first weld material of a predetermined hardness adjacent said edge and a second weld material of a lesser hardness than said first weld material on a side of said first weld material remote from said edge.

4. A method according to claim 1 wherein the shroud covers and buckets are located within a turbine and including applying weld material to the one shroud cover in situ without removal of a turbine bucket and said one shroud cover from the turbine.

5. A method according to claim 1 including applying weld material along a portion of a radial inwardly facing surface adjacent said edge of said one shroud cover.

6. A method according to claim 1 including applying weld material along a portion of a radial inwardly facing surface of an overlapping shroud cover adjacent the edge thereof in circumferential registration with said another shroud cover.

7. A method according to claim 1 including forming a plurality of edge portions angularly related to one another along said edge of said one shroud cover.

8. A method according to claim 7 including applying weld material along a radial facing surface of said one shroud cover and adjacent at least one of said edge portions.

9. A method according to claim 1 including forming a plurality of edge portions in a substantially Z-shaped configuration with leading, trailing and intermediate edge portions, and applying the weld material adjacent said intermediate edge portion.

10. A method according to claim 1 including applying weld material to the one shroud cover in situ without removal of a turbine bucket and said one shroud cover from the turbine, and applying weld material along a portion of a radial inwardly facing surface adjacent said edge of said one shroud cover.

11. A method according to claim 1 wherein the shroud covers and buckets are located within a turbine and including applying the weld material along a portion of a radial inwardly facing surface of an overlapping shroud cover adjacent the edge thereof in circumferential registration with said another shroud cover in situ without removal of a turbine bucket and said one shroud cover from the turbine.

12. A method according to claim 11 including applying a first weld material of a predetermined hardness adjacent said edge and a second weld material of a lesser hardness than said first weld material on a side of said first weld material remote from said edge.

13. A method according to claim 12 including forming a plurality of edge portions in a substantially Z-shaped configuration with leading, trailing and intermediate edge portions along said edge of said one shroud cover and applying the weld material along a radially inwardly facing surface of said one shroud cover and adjacent said intermediate edge portion.

14. A method of inhibiting overlap of adjacent shroud covers at tips of turbine buckets, comprising the step of:
   increasing the thickness of one of the adjacent shroud covers by applying weld material along a radial facing surface adjacent an edge thereof substantially in circumferential registration with another of the adjacent shrouds.

15. A method according to claim 14 including applying weld material along only a portion of the radial facing surface adjacent said edge of said one shroud cover.

16. A method according to claim 14 including applying a first weld material of a predetermined hardness adjacent said edge and a second weld material of a lesser hardness than said first weld material on a side of said first weld material remote from said edge.

17. A method according to claim 14 wherein the shroud covers and buckets are located within a turbine and including applying the weld material to the shroud cover in situ without removal of turbine buckets and said one shroud cover from the turbine.

18. A method according to claim 14 including applying weld material along a portion of a radial inwardly facing surface of an overlapping shroud cover adjacent the edge thereof in circumferential registration with said another shroud cover.

19. A method according to claim 18 including applying the weld material to the shroud cover in situ without removal of turbine buckets and said one shroud cover from the turbine.

20. A method according to claim 14 wherein the shroud covers and buckets are located within a turbine and including applying weld material along a portion of a radial inwardly facing surface of an overlapping shroud cover adjacent the edge thereof in circumferential registration with said another shroud cover, the step of applying weld material including applying a first weld material of a predetermined hardness adjacent said edge and a second weld material of a lesser hardness than said first weld material on a side of said first weld material remote from said edge, the step of applying weld material further including applying the weld material to the shroud cover in situ without removal of turbine buckets and said one shroud cover from the turbine.

* * * * *